Dec. 10, 1968     D. G. RADKE ET AL     3,415,538

SAFETY SEAT BELT WITH BUCKLE STORAGE MEANS

Filed April 21, 1967

INVENTOR.
DONALD G. RADKE
BY FREDERICK C. BOOTH

Hauke Knuss & Gifford

ATTORNEYS

United States Patent Office 3,415,538
Patented Dec. 10, 1968

3,415,538
SAFETY SEAT BELT WITH BUCKLE
STORAGE MEANS
Donald G. Radke, Troy, and Frederick C. Booth, Birmingham, Mich., assignors to Jim Robbins Seat Belt Co., Royal Oak, Mich.
Filed Apr. 21, 1967, Ser. No. 632,647
9 Claims. (Cl. 280—150)

ABSTRACT OF THE DISCLOSURE

A vehicle safety seat belt arrangement having both pelvic and upper torso restraint portions. A section of webbing having its lower end anchored to the vehicle on one side of the seat has two extending free ends each with a buckle section. A second lower webbing section anchored to the vehicle on the opposite side of the seat has a tongue engageable with one of the buckles to provide a pelvic restraint for the occupant. A third webbing section mounted to the ceiling of the vehicle has a lower end with a tongue engageable with the second of the buckles to form an upper torso restraint for the occupant. A secondary tongue attached to the dual buckle webbing section adjacent the pelvic restraint buckle provides means for storing the torso restraint buckle when the upper torso portions of the seat belt are not joined together.

Background of the invention (1) *Field of the invention.*—This invention relates to vehicle safety seat belts and more specifically to a first webbing section having a buckle normally engaged with a tongue carried by a second webbing section to form an occuptant restraint system with a secondary tongue attached to the first webbing section for engagement with the buckle when it is not actively employed as part of the restraint system.

(2) *Description of the prior art.*—Seat belt assemblies are becoming increasingly accepted as a standard accessory in automotive vehicles. In general, safety seat belt arrangements of the prior art comprise a lap belt assembly to provide a pelvic restraint on the occupant with respect to his seat. A typical lap belt comprises a pair of webbing sections having their lower ends anchored to the floor of the vehicle. Their upper ends encircle the occupant and are joined together by a buckle device. To store the unused webbing sections, various forms of retracting devices have been developed for withdrawing the extended operating end of the webbing to a stored position.

Recent interest in reducing the injury-producing features of automotive vehicles has resulted in belt arrangements forming an upper torso restraint for the occupant. In general, this form of restraint takes the form of a pair of webbing sections including an upper half arranged over one shoulder of the occupant and diagonally across his torso for connection by a buckle device to a lower half anchored to the floor. Variations of conventional retracting devices are employed with this type of webbing system to withdraw the unused webbing toward a stored position.

Recent interest has been directed to a seat belt system wherein both the pelvic restraint system and the upper torso restraint system have a common webbing section. This configuration has a number of advantages over the aforementioned belt assemblies wherein the pelvic restraint system and the upper torso restraint system comprise individual webbing assemblies. One form of this configuration employs a common webbing section having its lowered end anchored to the vehicle and an upper end extending from the anchor point to form two free ends each having a quick release buckle with a tongue-receiving aperture. One buckle is engageable with a tongue section carried by a second webbing section having a lower end anchored to the floor of the vehicle to form a pelvic restraint or lap belt system. The second buckle on the common webbing engages a second tongue carried by an overhead mounted webbing section to form an upper torso restraint arranged diagonally across the torso of the occupant.

The problem with the combined pelvic and upper torso seat belt arrangement is that the common webbing section with the double buckle arrangement does not lend itself to conventional storage means when one or both of the buckles are not actively employed as a part of their associated restraint system. For instance, there are occasions when the pelvic restraint sections of the seat belt arrangement are joined together but for some reason the upper torso sections of the belt arrangement are not joined so that one buckle is loose. Since both buckles are attached to the common webbing section, conventional retractor means or other storage devices are not suitable to maintain the loose buckle in a convenient stored position which at the same time presents a pleasant appearance.

It is the broad purpose of the present invention to provide storage means for seat belt arrangements of the aforementioned configuration and which obviates the storage problems related to this type of arrangement.

Summary

The preferred embodiment of the present invention is described with reference to a combined pelvic and upper torso belting system and employs a first webbing section which is anchored to the floor of the vehicle and extends upwardly to one side of the occupant. The first webbing section carries two conventional quick release buckle sections each attached at the end of a short webbing end. A second webbing section has its lower end anchored to the vehicle and extends upwardly around the opposite side of the occupant with a conventional tongue section joinable with one of the buckles. The two joined sections of webbing thereby provide a pelvic restraint for the occupant.

The second buckle provides means for joining an overhead mounted webbing section arranged to diagonally cross the upper torso of the occupant and which carries a tongue engageable with the second buckle at a fairly low position on the occupant's side. For this reason, the second buckle is attached to a shorter section of webbing than the first buckle. This arrangement assures that in the event of a sudden deceleration of the vehicle, the seat belt assembly will provide an upper torso restraint without shifting the pelvic restraint into the abdominal region of the occupant.

A secondary tongue section is attached to the first webbing section adjacent the pelvic buckle with its free end directed away from the pelvic buckle. The secondary tongue is preferably formed of a suitable plastic material and has a configuration corresponding to the stress-transmitting tongue carried by the overhead mounted webbing so that it is engageable with the inactive buckle.

This arrangement provides a number of novel advantages. When the upper torso buckle is not actively employed as a part of the upper torso restraint system, the buckle can be engaged with the secondary tongue so that it is readily accessible, presents a pleasing appearance and does not interfere with the movements of the occupant.

When the pelvic buckle is not actively employed as part of the pelvic restraint system, the two inactive buckles are joined to the first webbing section adjacent one another so that they are easily accessible to the occupant when he assumes his seated position and permit him to join the pelvic webbing sections across his lap and then quickly engage the upper torso sections without having to search for the buckle associated with the upper torso restraint system.

It is therefore an object of the present invention to provide a seat belt arrangement having a pair of webbing sections, one section having a first coupling section engageable with a complementarily formed coupling carried by the opposite webbing to form an occupant restraint, and means for storing the first coupling section when it is disengaged from the complementarily formed coupling section by providing a second complementarily formed coupling section attached to the same section of webbing which carries the first coupling section.

It is another object of the present invention to improve seat belt arrangements employing a pair of buckle sections attached to a common section of webbing with one of the buckle sections actively employed as part of a restraint system by providing means mounted on the common section of webbing for storing the opposite buckle section when it is not actively employed as part of its associated restraint system.

Still further objects and advantages of the present invention will become readily apparent to one skilled in the art to which the invention pertains upon reference to the following detailed description.

*Description of the drawings*

The description refers to the accompanying drawings in which like reference characters refer to like parts throughout the several views and in which.

*Description of the preferred embodiment*

Figure 1:
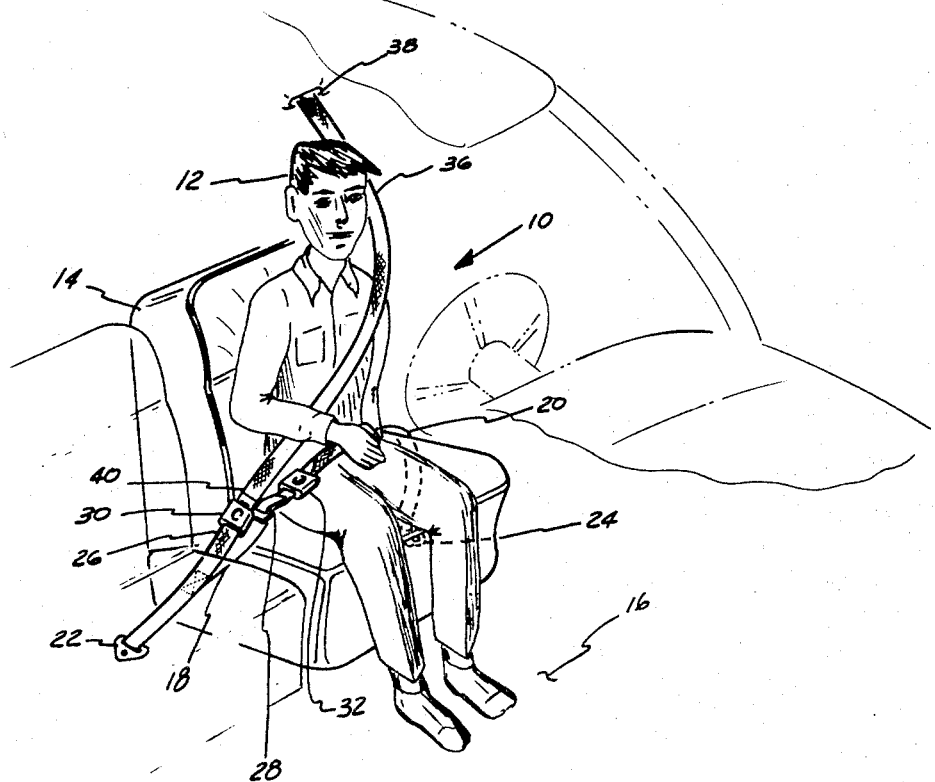
FIG. 1 illustrates a vehicle seat belt arrangement having combined pelvic and upper torse restraint sections and illustrating a preferred embodiment of the invention.
Figure 3:
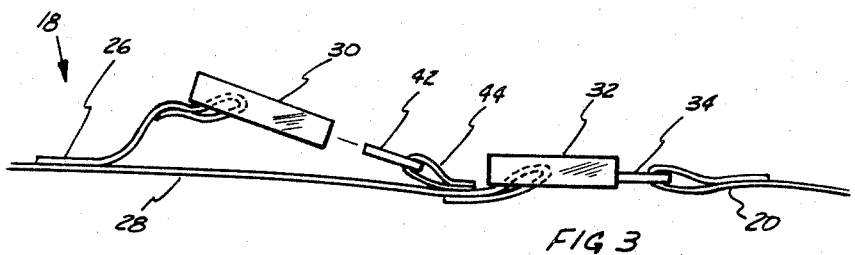
FIG. 3 is a view similar to FIG. 2 but with the upper torso buckle disengaged from the secondary tongue.
Figure 2:
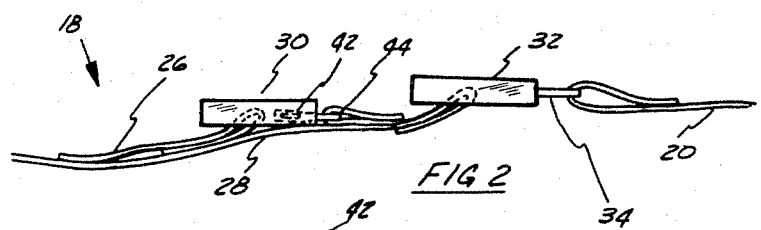
FIG. 2 is an enlarged view of the buckles illustrated in FIG. 1 with the pelvic buckle actively engaged as part of the pelvic restraint and the upper torso buckle illustrated in a stored position in engagement with the secondary tongue.

Now referring to the drawings, FIG. 1 illustrates a vehicle safety seat belt arrangement 10 for providing a restraining force on an occupant 12 seated in a seat assembly 14. The seat assembly 14 is mounted above the floor 16 of the vehicle. The seat belt assembly 10 includes a pair of lower webbing sections 18 and 20. The lower ends 22 and 24 of the respective webbing sections 18 and 20 are anchored to the floor 16 of the vehicle or other suitable fixed part of the vehicle and on opposite lateral sides of seat assembly 14. The webbing section 18 has a pair of free ends 26 and 28 each of which carries a conventional quick release buckle section 30 and 32 respectively. The webbing section 20 has a tongue section 34 attached to its free end and engageable with the buckle section 32 to provide a pelvic restraint across the lap of the occupant 12. The buckle 32 and the tongue 34 preferably form what is commonly referred to as a metal-to-metal buckle device.

An overhead mounted webbing section 36 preferably having its upper end extensible out of an opening 38 in the ceiling of the vehicle and anchored to the ceiling by any conventional means, carries a tongue section 40 at its lower end for engagement with the buckle section 30. The tongue 40 is similar to the tongue 34 and engages the buckle section 30 in a metal-to-metal relationship so that the end section 26 is joined to the overhead mounted webbing section 36 to provide an upper torso restraint extending diagonally across the occupant 12 and over his shoulder. Thus, it can be seen that the webbing 18 provides a common connection for both the pelvic restraint and the upper torso restraint and the vehicle.

A secondary tongue 42 is attached by a short strip of webbing 44 to the end section 28 preferably by stitching or the like. The secondary tongue 42 has a configuration similar to the tongue 40 and is preferably attached to the end section 28 adjacent the buckle section 32 with its free end directed away from the buckle section 32.

Figure 4:
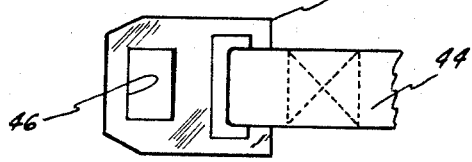
FIG. 4 is a view of the secondary tongue disengaged from its associated buckle.

As can best be seen in FIG. 4, the secondary tongue 42 has an aperture 46 which is engageable by a latch element (not shown) carried by the buckle section 30. The secondary tongue 42 is not intended to transmit restraint forces and therefore is preferably formed of a relatively low cost plastic material.

Now it can be seen that the secondary tongue 42 provides means for conveniently retaining the buckle section 30 when it is not employed as part of the upper torso restraint. When the lower buckle section 32 is actively employed as a part of the pelvic restraint, the buckle 30 is maintained in an accessible position without interfering with the movements of the occupant 12. When the buckle section 32 is not employed as part of the pelvic restraint system, the buckles 30 and 32 are maintained in a neat configuration adjacent one another so that they can be disposed in any convenient position by the occupant 12.

Although we have described but one preferred embodiment of my invention, it is to be understood that various changes and revisions can be made therein without departing from the spirit of the invention as expressed in the scope of the appended claims.

What is claimed is:

1. In a vehicle having a seat belt assembly, the combination comprising:
    (a) an elongated section of webbing forming a part of said seat belt assembly;
    (b) means anchoring said elongated webbing to the vehicle;
    (c) a first coupling section attached to said elongated webbing;
    (d) means providing a second coupling section engageable with said first coupling section; the engagement of said first coupling section and said second coupling section providing an occupant restraint system; and
    (e) a third coupling section attached to said elongated webbing, said third coupling section being engageable with said first coupling section when said first coupling section is disengaged from said second coupling section, whereby the engagement of said first coupling section and said third coupling section provides means for storing said first coupling section.

2. The invention as defined in claim 1, wherein said first coupling section comprises a buckle section having a tongue receiving aperture, and said second coupling section comprises a tongue section engageable with said buckle section to provide a releasable connection in said occupant restraint system.

3. The invention as defined in claim 2, wherein said third coupling section comprises a second tongue section attached to said webbing and engageable with said buckle section when said buckle section is not actively employed as a stress-transmitting portion of said occupant restraining system.

4. The invention as defined in claim 3, wherein said webbing has a first free end and a second free end, said buckle section being attached to said first free end and said second tongue being attached to said second free end.

5. The invention as defined in claim 2, wherein said webbing has two free ends, said buckle section attached to one of said free ends, a second buckle section attached to the other of said free ends, and an element having a tongue-shaped configuration similar to said tongue member being attached to said second free end and adjacent said second buckle section.

6. In a vehicle seat belt assembly, the combination comprising:
(a) a first webbing section;
(b) a second webbing section;
(c) buckle means joining said first webbing section to said second webbing section to provide a pelvic restraint for an occupant of said webbing sections;
(d) a third webbing section attached to said first webbing section;
(e) a buckle section attached to said third webbing section and having a tongue receiving aperture, said buckle section engageable with means providing a first tongue section to form an upper torso restraint; and
(f) a second tongue section attached to said first webbing section, said second tongue section engageable with said buckle section when said buckle section is disengaged from said first tongue section.

7. The invention as defined in claim 6, wherein said second tongue section is joined to said first webbing section adjacent said buckle means.

8. The invention as defined in claim 7, wherein said second tongue section is formed of a plastic material.

9. The invention as defined in claim 7, wherein the free end of said second tongue section extends in a direction away from said buckle means.

References Cited

UNITED STATES PATENTS

| | | | |
|---|---|---|---|
| 3,243,233 | 3/1966 | Davis | 297—385 |
| 3,258,293 | 6/1966 | Sharp | 297—385 |
| 3,351,382 | 11/1967 | Davis | 280—150 |

LEO FRIAGLIA, *Primary Examiner.*

R. SONG, *Assistant Examiner.*

U.S. Cl. X.R.

297—385